(12) United States Patent
Saadany et al.

(10) Patent No.: US 8,873,125 B2
(45) Date of Patent: Oct. 28, 2014

(54) TECHNIQUE TO DETERMINE MIRROR POSITION IN OPTICAL INTERFEROMETERS

(75) Inventors: Bassam A. Saadany, Nasr (EG); Amr N. Hafez, Cairo (EG); Mostafa Medhat, Heliopolis (EG); Hisham Haddara, Heliopolis (EG)

(73) Assignee: Si-Ware Systems, Cairo (EG)

( * ) Notice: Subject to any disclaimer, the term of this patent is extended or adjusted under 35 U.S.C. 154(b) by 702 days.

(21) Appl. No.: 13/044,238

(22) Filed: Mar. 9, 2011

(65) Prior Publication Data

US 2011/0222067 A1 Sep. 15, 2011

Related U.S. Application Data

(60) Provisional application No. 61/311,966, filed on Mar. 9, 2010.

(51) Int. Cl.
*G02B 26/08* (2006.01)
*G01B 7/06* (2006.01)
*G01B 9/02* (2006.01)

(52) U.S. Cl.
CPC .............. *G02B 26/0841* (2013.01); *G01B 7/08* (2013.01); *G01B 9/02071* (2013.01)
USPC ..... 359/223.1; 324/662; 359/291; 359/237.1; 385/18; 250/458.1

(58) Field of Classification Search
USPC ........................................ 324/662; 359/223.1
See application file for complete search history.

(56) References Cited

U.S. PATENT DOCUMENTS

| 5,969,848 | A | * | 10/1999 | Lee et al. ....................... 359/298 |
| 6,625,341 | B1 | * | 9/2003 | Novotny ........................... 385/18 |
| 7,034,975 | B1 | * | 4/2006 | Islam et al. ................. 359/224.1 |
| 7,301,643 | B2 | * | 11/2007 | Kenda et al. ................... 356/452 |
| 7,569,805 | B2 | * | 8/2009 | Yun et al. ....................... 250/216 |
| 7,764,417 | B1 | * | 7/2010 | Chang et al. ................... 359/279 |
| 7,884,947 | B2 | * | 2/2011 | De Lega et al. ............... 356/511 |
| 2003/0094914 | A1 | * | 5/2003 | Yanagita et al. .............. 318/560 |
| 2003/0169962 | A1 | * | 9/2003 | Rajan et al. ...................... 385/18 |
| 2003/0174376 | A1 | * | 9/2003 | Sane et al. ...................... 359/237 |
| 2003/0202177 | A1 | * | 10/2003 | Reznichenko et al. ..... 356/237.1 |
| 2005/0002084 | A1 | * | 1/2005 | Wan ................................ 359/291 |
| 2005/0286111 | A1 | * | 12/2005 | Muenter ......................... 359/291 |
| 2006/0268383 | A1 | * | 11/2006 | Cho et al. ....................... 359/223 |
| 2006/0279198 | A1 | * | 12/2006 | Yun et al. ....................... 313/495 |
| 2007/0080695 | A1 | * | 4/2007 | Morrell et al. ................. 324/658 |

(Continued)

FOREIGN PATENT DOCUMENTS

GB 2385946 A 9/2003

OTHER PUBLICATIONS

International Search Report and Written Opinion for PCT/US2011/027686 dated Jul. 6, 2011 (11 pages).

*Primary Examiner* — Benjamin M Baldridge
(74) *Attorney, Agent, or Firm* — Garlick & Markison; Holly L. Rudnick

(57) ABSTRACT

A Micro Electro-Mechanical System (MEMS) interferometer system utilizes a capacitive sensing circuit to determine the position of a moveable mirror. An electrostatic MEMS actuator is coupled to the moveable mirror to cause a displacement thereof. The capacitive sensing circuit senses the current capacitance of the MEMS actuator and determines the position of the moveable mirror based on the current capacitance of the MEMS actuator.

20 Claims, 4 Drawing Sheets

(56) References Cited

U.S. PATENT DOCUMENTS

| | | | |
|---|---|---|---|
| 2008/0080034 A1* | 4/2008 | Saadany et al. | 359/223 |
| 2008/0123167 A1* | 5/2008 | Weiss et al. | 359/198 |
| 2008/0164423 A1* | 7/2008 | Bailey | 250/482.1 |
| 2008/0181553 A1* | 7/2008 | Discenzo | 385/12 |
| 2008/0240715 A1* | 10/2008 | Last et al. | 398/50 |
| 2010/0091372 A1* | 4/2010 | Yamanoi et al. | 359/578 |
| 2010/0284015 A1* | 11/2010 | Sewell | 356/450 |
| 2010/0284017 A1* | 11/2010 | Reyes et al. | 356/452 |
| 2011/0139990 A1* | 6/2011 | Xie et al. | 250/353 |
| 2012/0080612 A1* | 4/2012 | Grego et al. | 250/458.1 |

* cited by examiner

TECHNIQUE TO DETERMINE MIRROR POSITION IN OPTICAL INTERFEROMETERS

CROSS REFERENCE TO RELATED PATENTS

The present U.S. Utility Patent Application claims priority pursuant to 35 U.S.C. §119(e) to the following U.S. Provisional Patent Application Ser. No. 61/311,966, entitled "Electronics for MEMS-based systems: design issues and tradeoffs," filed Mar. 9, 2010, which is hereby incorporated herein by reference in its entirety and made part of the present U.S. Utility patent application for all purposes:

BACKGROUND OF THE INVENTION

1. Technical Field of the Invention

The present invention relates in general to optical spectroscopy and interferometry, and in particular to the use of Micro Electro-Mechanical System (MEMS) technology in optical interferometers.

2. Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices facilitates the integration of such MEMS devices into mobile and hand held devices.

Moreover, MEMS technology, with its numerous actuation techniques, enables the realization of new functions and features of photonic devices, such as optical tunability and dynamic sensing applications. For example, by using MEMS actuation (electrostatic, magnetic or thermal) to control a movable mirror of a Michelson Interferometer, small displacements in the interferometer optical path length can be introduced, and consequently, a differential phase between the interfering beams can be obtained. The resulting differential phase can be used to measure the spectral response of the interferometer beam (e.g., using Fourier Transform Spectroscopy), the velocity of the moving mirror (e.g., using the Doppler Effect), or simply as an optical phase delay element.

A key component in the accuracy of such interferometers is determining the position of the moveable mirror. Traditionally, a laser and auxiliary interferometer have been used to measure the moving mirror position. However, introducing a bulky laser source and additional interferometer increases the size, cost and complexity of the interferometer system.

Therefore, there is a need for a mechanism to determine the moveable mirror position with reduced size, cost and complexity.

SUMMARY OF THE INVENTION

Embodiments of the present invention provide a Micro Electro-Mechanical System (MEMS) apparatus that includes a moveable mirror and a MEMS actuator coupled to the moveable mirror to cause a displacement thereof. The MEMS actuator has a variable capacitance. A capacitive sensing circuit is coupled to the MEMS actuator to sense a current capacitance of the MEMS actuator and determine a position of the moveable mirror based on the current capacitance of the MEMS actuator.

In one embodiment, the MEMS actuator is an electrostatic actuator having two plates, and the capacitive sensing circuit senses the current capacitance between the two plates. In an exemplary embodiment, the MEMS actuator is an electrostatic comb drive actuator.

In a further embodiment, the capacitive sensing circuit includes a capacitance-to-voltage converter for receiving the current capacitance and producing an output voltage proportional to the capacitance.

In still a further embodiment, the capacitive sensing circuit includes an application specific integrated circuit for sensing the current capacitance of the MEMS actuator and a digital signal processor for determining the position of the moveable mirror based on the current capacitance. In an exemplary embodiment, the application specific integrated circuit further generates an actuation signal to cause motion of the MEMS actuator. In a further exemplary embodiment, the MEMS actuator, the moveable mirror and the application specific integrated circuit are integrated together on a die package.

Embodiments of the present invention further provide a Micro Electro-Mechanical System (MEMS) interferometer system including an interferometer having a moveable mirror optically coupled to receive and reflect light. The MEMS interferometer system also includes the MEMS actuator coupled to the moveable mirror to cause a displacement thereof and the capacitive sensing circuit coupled to the MEMS actuator for sensing a current capacitance of the MEMS actuator and determining a position of the moveable mirror based on the current capacitance of the MEMS actuator.

In an exemplary embodiment, the interferometer further includes a beam splitter optically coupled to receive an incident beam and to split the incident beam into a first interfering beam and a second interfering beam and a fixed mirror optically coupled to receive the first interfering beam and to reflect the first interfering beam back towards the beam splitter to produce a first reflected interfering beam. The moveable mirror is optically coupled to receive the second interfering beam and to reflect the second interfering beam back towards the beam splitter to produce a second reflected interfering beam. A detector is optically coupled to detect an interference pattern produced as a result of interference between the first reflected interfering beam and the second reflected interfering beam. In one embodiment, the displacement of the moveable mirror produces an optical path length difference between the first and second interfering beams equal to twice the displacement.

In another exemplary embodiment, the interferometer includes a wide band light source for producing a light beam, a first arm including the moveable mirror, a second arm including a fixed mirror and a beam splitter for splitting the light beam to traverse both the first arm and the second arm. The moveable mirror is moveable through both sides of a zero position corresponding to a zero optical path difference of the light beam between the first and second arms of the interferometer. The interferometer records an interferogram on both sides of the zero position for use by the digital signal processor in phase correction.

Embodiments of the present invention still further provide a method for determining a position of a moveable mirror within a Micro Electro-Mechanical System (MEMS) apparatus. The method includes providing a MEMS actuator coupled to the moveable mirror, in which the MEMS actuator has a variable capacitance. The method further includes displacing the moveable mirror using the MEMS actuator, sensing a current capacitance of the MEMS actuator and determining the position of the moveable mirror based on the current capacitance of the MEMS actuator.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, a technique is provided to determine the position of a moveable mirror in Micro Electro-Mechanical System (MEMS) applications, such as interferometer/spectrometer applications. This technique enables the integration of the interferometer/spectrometer system on a small chip and reduces the cost and complexity of the system.

Figure 1:
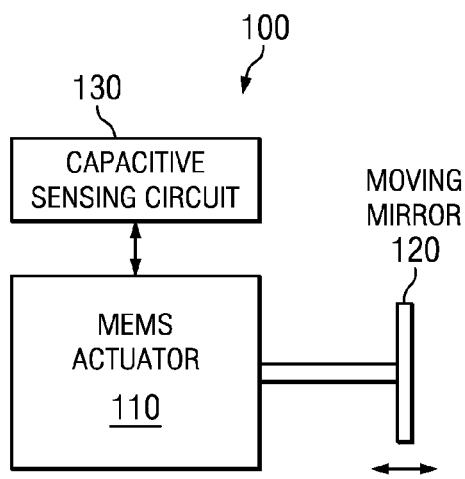
FIG. 1 is a block diagram of an exemplary Micro Electro Mechanical System (MEMS) apparatus for determining the position of a moveable mirror in accordance with embodiments of the present invention.

Referring now to FIG. 1, there is illustrated an exemplary MEMS apparatus 100, in accordance with embodiments of the present invention. The MEMS apparatus 100 includes a MEMS actuator 110 and a moveable mirror 120. The MEMS actuator 110 is an electrostatic actuator, such as a comb drive actuator, parallel plate actuator or other type of electrostatic actuator. The moveable mirror 120 is coupled to the MEMS actuator 110, such that motion of the MEMS actuator causes a displacement in the position of the moveable mirror 120.

In many MEMS applications, it is necessary to have knowledge of the position of the moveable mirror 120. For example, in interferometer applications, the position of the moveable mirror 120 is used to process the output of the interferometer.

Figure 2:
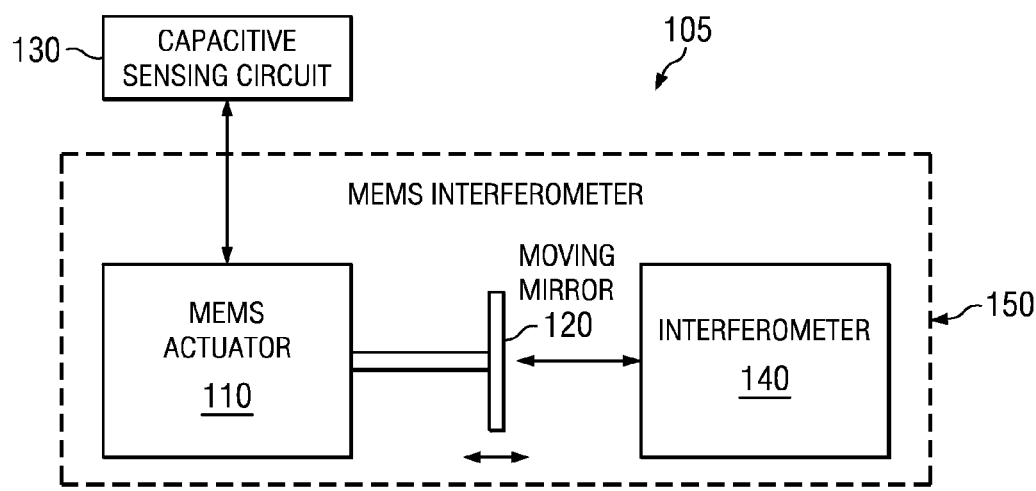
FIG. 2 is a block diagram illustrating exemplary components of a MEMS interferometer system for determining the position of the moveable mirror in accordance with embodiments of the present invention.

An example of a MEMS interferometer system 105 is shown in FIG. 2. As can be seen in FIG. 2, the MEMS actuator 110 and moveable mirror 120, together with other components of an interferometer 140, such as a beam splitter, fixed mirror and photodetector (as described in more detail below in connection with FIG. 7) form a MEMS interferometer 150. The MEMS interferometer 150 may be, for example, a Fourier Transform Infrared Spectroscopy (FTIR) spectrometer, a Michelson interferometer, a Mach Zender interferometer or a Fabry-Perot interferometer.

The displacement of the moveable mirror 120 produces an optical path length difference between the two arms of the interferometer 140 in order to achieve the desired interference pattern at the photodetector. To effectively process the signal output from the photodetector, the position of the moveable mirror 120 in at least one plane must be ascertained.

Therefore, referring now to FIGS. 1 and 2, in order to measure the moveable mirror position, the MEMS apparatus 100 also includes a capacitive sensing circuit 130 coupled to the MEMS actuator 110. Since the MEMS actuator 110 is an electrostatic actuator, the MEMS actuator 110 has a variable capacitance that can be measured by the capacitive sensing circuit 130. For example, in one embodiment, the capacitive sensing circuit 130 can be coupled to the two plates of the MEMS actuator 110 to detect the capacitance between the plates (i.e., measure the current value of the capacitance, hereinafter referred to as the "current capacitance," of the MEMS actuator).

Based on the measured current capacitance, the position of the moveable mirror 120 can be determined. As can be appreciated, the separation (distance) between the two plates of the MEMS actuator 110 varies as the mirror 120 moves. Since the MEMS actuator 110 is an electrostatic actuator, the capacitance between the two plates is directly (or in some cases inversely) proportional to the separation between the two plates. As such, the capacitance between the plates can be used to determine this separation, which in turn can be used to determine the mirror position.

Figure 3:
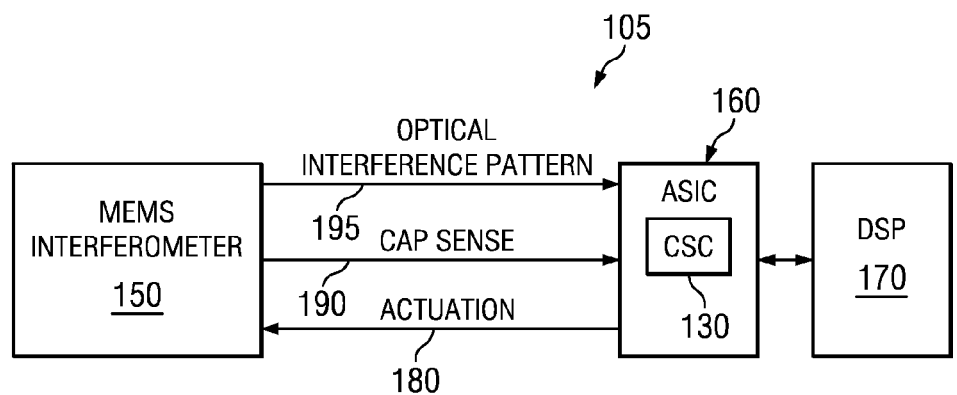
FIG. 3 is a block diagram illustrating further exemplary components of the MEMS interferometer system in accordance with embodiments of the present invention.

FIG. 3 is a block diagram illustrating exemplary components of the MEMS interferometer system 105 in accordance with embodiments of the present invention. In FIG. 3, the capacitive sensing circuit (CSC) 130 is implemented within an application specific integrated circuit (ASIC) 160. The ASIC 160 is further coupled to the MEMS interferometer 150 and to a digital signal processor (DSP) 170. In one embodiment, the DSP 170 is implemented on the ASIC 160. Integrating the DSP 170 on the ASIC 160 yields an attractive, self-contained solution that can be easily integrated in a larger system. However, this imposes restrictions on the ASIC technology selection and may result in interference between the digital part and the sensitive analog front end. Therefore, in other embodiments, the DSP 170 can be implemented on another ASIC or as software executable on a general-purpose personal computer.

The CSC 130 within the ASIC 160 is coupled to receive a capacitive sensing signal 190 from the MEMS actuator of the MEMS interferometer 150. The CSC 130 measures the capacitive sensing signal 190 to determine the current capacitance of the MEMS actuator and transmits the value of the current capacitance to the DSP 170. The DSP 170 processes the current capacitance value to determine the position of the moving mirror within the MEMS interferometer 150.

The ASIC 160 also includes circuitry for generating an actuation signal 180 and transmitting the actuation signal 180 to the MEMS actuator of the MEMS interferometer 150 to control movement of the MEMS actuator. For example, in an exemplary embodiment, the ASIC 160 includes a digital-toanalog converter (DAC) that supports any arbitrary actuation profile. The DAC may also be of very high resolution in order to reduce actuation noise and have a very high spurious-free dynamic range to ensure that unwanted resonance modes are not excited.

In addition, the ASIC 160 is further coupled to receive an optical interference pattern 195 output from the MEMS interferometer 150 and to provide the optical interference pattern 195 to the DSP 170 for processing. For example, in an exemplary embodiment, the MEMS interferometer system 105 is a MEMS FTIR spectrometer system that uses a general purpose MEMS-interface CMOS ASIC 160. In this embodiment, the MEMS interferometer 150 includes a photodetector, a fixed mirror and the moveable mirror. With the motion of the moveable mirror, the photodetector captures the optical interference pattern 195. The ASIC 160 may include a low-noise signal conditioning path that amplifies the signal, removes any dc offsets and provides necessary anti-aliasing filtering. The signal conditioning may be performed in a highly linear manner to reduce any spurious tones in the final output spectrum. At the DSP 170, spectrum analysis of the conditioned pattern with knowledge of the position of the moveable mirror can identify the light wavelength and the spectral print of any material in the light path.

Figure 4:
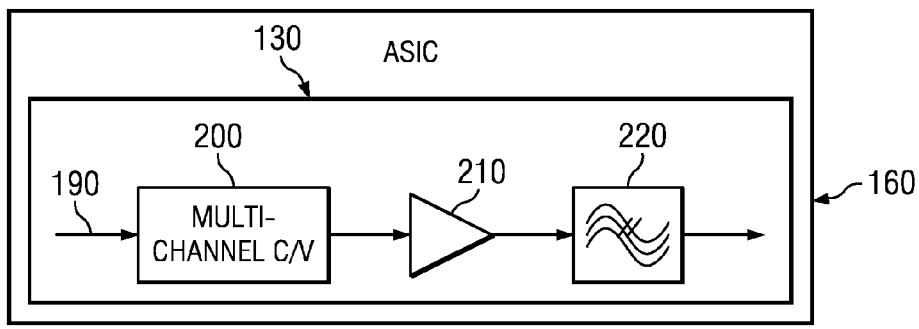
FIG. 4 is a block diagram illustrating exemplary components of an application specific integrated circuit (ASIC) for use within the MEMS interferometer system, in accordance with embodiments of the present invention.

Referring now to FIG. 4, an exemplary CRC 130 is shown. The CRC 130 includes a capacitance-to-voltage converter (C/V) 200, amplifier 210 and low pass filter 220. The C/V 200 is coupled to receive the capacitive sensing signal 190 indicating the current capacitance of the MEMS actuator and operates to convert the current capacitance into a voltage. In particular, the C/V produces a voltage output proportional to the capacitance between the two terminals of the MEMS actuator. The amplifier 210 amplifies the voltage output from the C/V 200 and the low pass filter 220 filters the voltage to remove any spurious signals. In an exemplary embodiment, the C/V 200 is a very low noise C/V that has a wide range of gain and dc offset removal to support wide capacitance ranges superimposed on various fixed capacitances. Low noise levels are desired for the CRC 130, since the mirror position inaccuracy directly impacts the system signal-to-noise ratio (SNR). The ASIC 160 may also exhibit very low voltage and noise levels to allow for resolutions in excess of 18 bits. In further embodiments, the ASIC 160 may also include capacitance calibration circuitry to calibrate the C/V 200.

Figure 5:
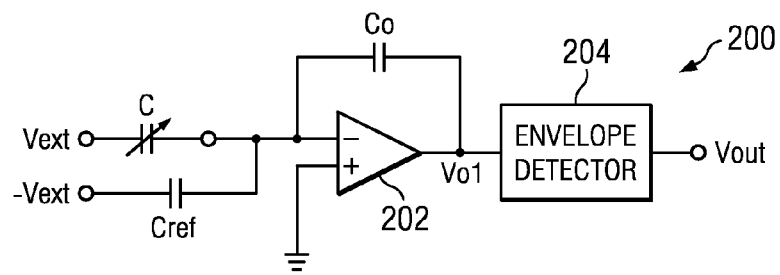
FIG. 5 is a circuit diagram illustrating an exemplary capacitance to voltage circuit for use within the ASIC of FIG. 4, in accordance with embodiments of the present invention.

An example of a C/V 200 is shown in FIG. 5. The C/V 200 includes an input terminal for receiving a capacitance being measured C, an input terminal for receiving a reference capacitance Cref, an operational amplifier 202, a feedback capacitor Co and an Envelope Detector circuit 204. In an exemplary operation, an ac signal of known frequency (for example, 10 kHz) is applied to one terminal of capacitance C, while a negative version of the same excitation signal is applied to the reference capacitor Cref. The output of the operational amplifier 202 is an ac signal of the same frequency whose amplitude is proportional to the value (C-Cref).

The Envelope Detector circuit 204 detects the envelope of the output of the operational amplifier 202. In particular, the Envelope Detector circuit 204 operates to generate an output voltage proportional to the amplitude (envelope) of the ac signal output from the operational amplifier 202. As shown in FIG. 5, the Envelope Detector circuit 204 detects the envelope of signal Vol output from the operational amplifier 202 and produces a voltage Vout that is proportional to the value of the capacitance being measured. It should be understood other circuit designs for the C/V 200 are possible, and the present invention is not limited to any particular C/V circuit design.

For example, in another embodiment, the C/V 200 may have multiple terminals to sense the difference in two capacitors, where the differential value is proportional to the mirror position.

Figure 6:
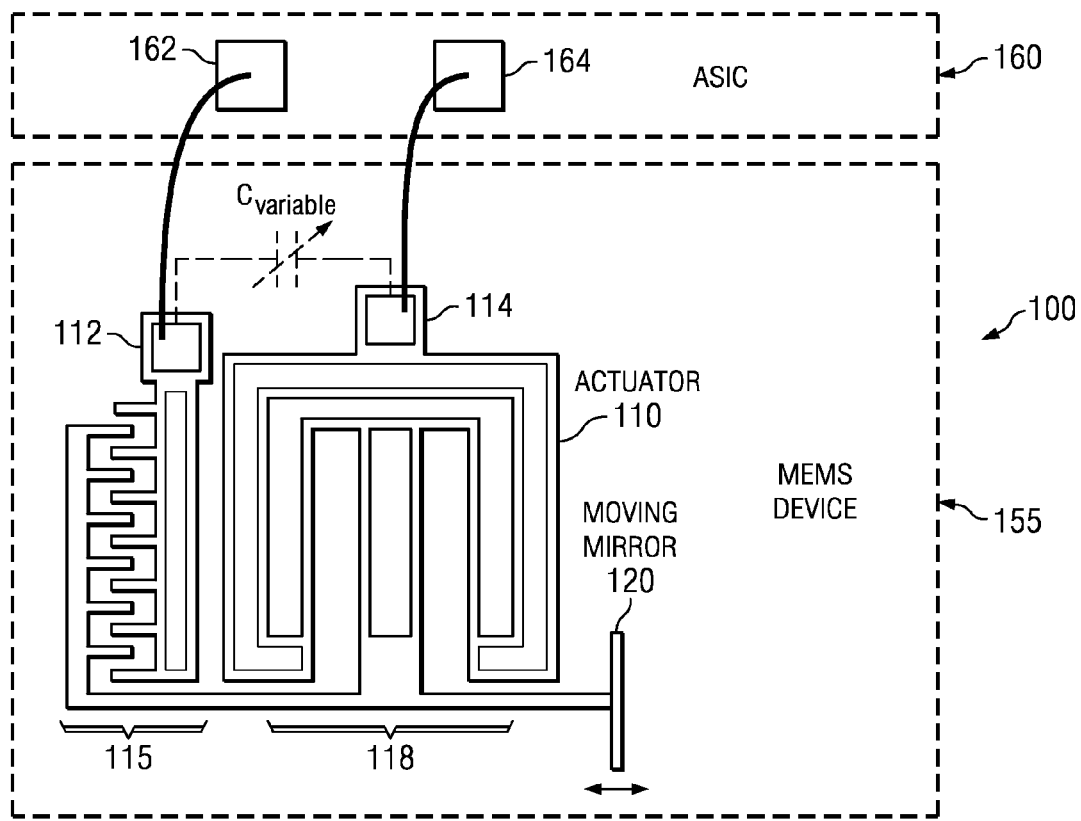
FIG. 6 is a diagram illustrating an exemplary architecture of the MEMS apparatus, in accordance with embodiments of the present invention.

FIG. 6 is a diagram illustrating an exemplary architecture of the MEMS apparatus 100, in accordance with embodiments of the present invention. The MEMS apparatus 100 includes the ASIC 160 and a MEMS device 155, such as a MEMS interferometer. The MEMS device 155 includes an electrostatic comb drive MEMS actuator 110 and a moveable mirror 120. The electrostatic comb drive MEMS actuator 110 shown in FIG. 6 is formed of a comb drive 115 and spring 118, each having a respective terminal 112 and 114. By applying a voltage to the comb drive 115 at terminal 112, a potential difference results across the actuator 110, which induces a capacitance therein, causing a driving force to be generated as well as a restoring force from the spring 118, thereby causing a displacement of moveable mirror 120 to the desired position. The induced capacitance Cvariable can be measured across terminals 112 and 114 by connecting terminals 112 and 114 to ports 162 and 164 on the ASIC 160.

In one embodiment, the actuation signal from ASIC 160 is transmitted over the same port (port 162) as the capacitance sensing signal using time or frequency division multiplexing. By having both functions (actuation and capacitive sensing) on a single port, the maximum actuation voltage necessary may be reduced, while also increasing the sensed capacitance. However, this may lead to undesired interaction between the sense and actuation circuitry. Therefore, in other embodiments, the actuation signal is sent over a different port (not shown) on the ASIC 160. It should be understood that the layout and features of the MEMS actuator 110 shown in FIG. 6 are merely exemplary, and that the invention can be realized with any electrostatic MEMS actuator design, whether a comb drive actuator, parallel plate actuator or other type of electrostatic MEMS actuator.

Figure 7:
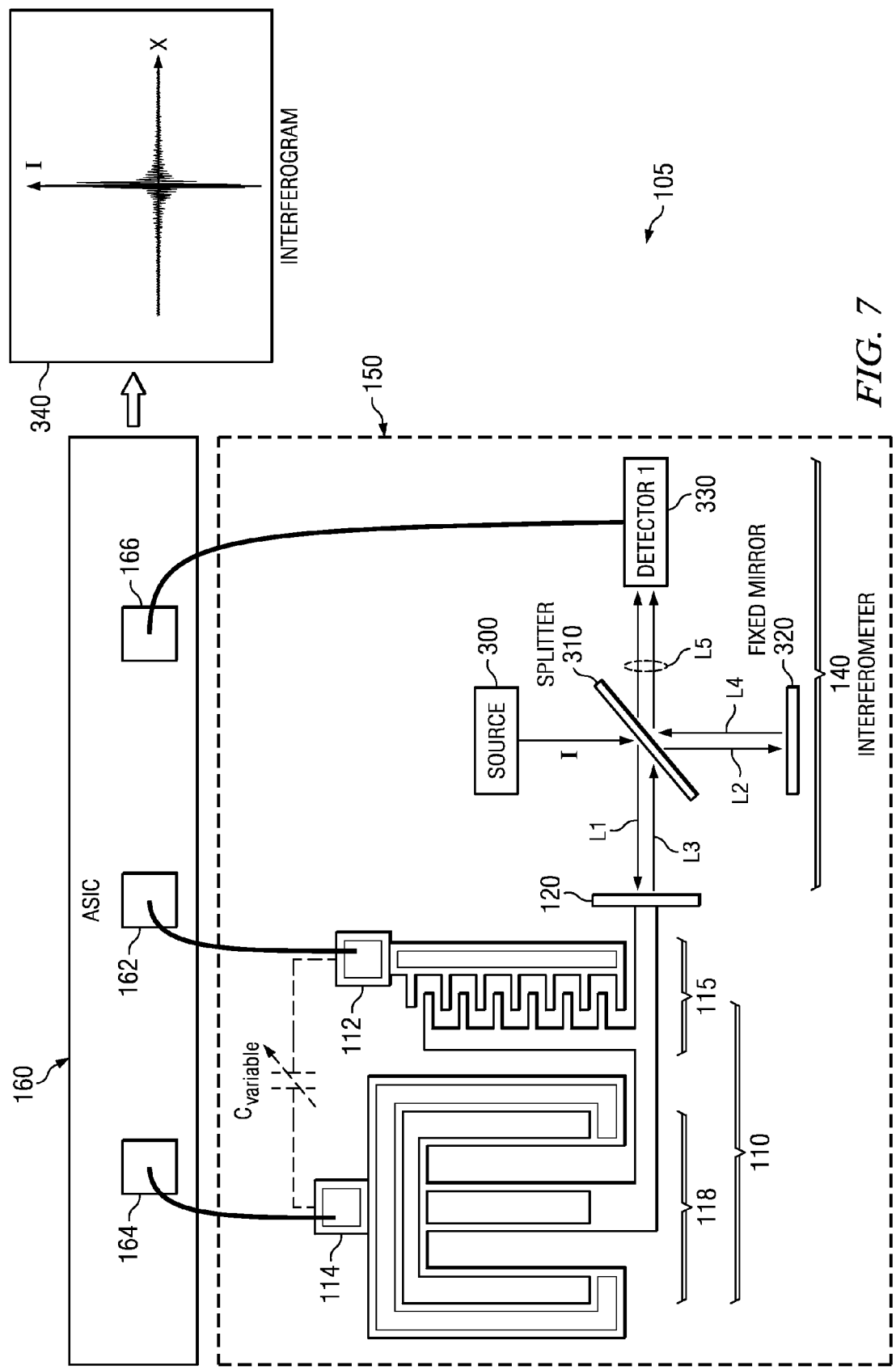
FIG. 7 is a diagram illustrating an exemplary architecture of the MEMS interferometer system, in accordance with embodiments of the present invention.

FIG. 7 is a diagram illustrating an exemplary architecture of the MEMS interferometer system 105, in accordance with embodiments of the present invention. The MEMS interferometer system 105 includes the MEMS interferometer 150 and ASIC 160. The MEMS interferometer 150 may be, for example, a Fourier Transform Infrared (FTIR) spectrometer that is realized over an SOI wafer to allow for a MEMS-actuated moving mirror.

The MEMS interferometer 150 includes the MEMS actuator 110 and interferometer 140. As shown in FIG. 7, the interferometer 140 includes a light source 300, beam splitter 310, fixed mirror 320, photodetector 330 and moveable mirror 120. The light source 300 produces an incident beam I that travels through the interferometer 140 until it reaches the half plane beam splitter 310. In an exemplary embodiment, the beam splitter 30 is formed at an interface between a first medium (i.e., silicon (Si)) and a second medium (i.e., air). The silicon/air interface beam splitter 310 is positioned at an angle (for example, 45 degrees) from the incident beam I. The desired angle may be produced, for example, by photolithographically defining a surface of the silicon medium.

Upon impinging the half plane beam splitter 310, the incident beam I is split into two interfering beams L1 and L2. L1 originates from the partial reflection of the incident beam I from the silicon/air half plane beam splitter 310, and thus has a reflection angle equal to the beam incidence angle. L2 originates from the partial transmission of the incident beam I through silicon/air half plane beam splitter 310 and propagates at least partially in silicon at a refraction angle (determined by Snell's law). As a result, L1 propagates towards the moveable mirror 120, while L2 propagates towards fixed mirror 320.

Beam L1 is reflected by moveable mirror 120, thus producing reflected beam L3, while beam L2 is reflected by fixed mirror 320, thus producing reflected beam L4. As shown in FIG. 7, both beams L3 and L4 take the same optical path of L1 and L2 respectively (in the opposite direction) after reflection from mirrors 120 and 320 respectively, back towards the half plane beam splitter 30. Thus, in embodiments in which the spectrometer/interferometer is used as a Fourier Transform (FT) spectrometer, one interferometer arm is formed by beams L1/L3 and includes the beam splitter 310 and moveable mirror 120, while another interferometer arm is formed by beams L2/L4 and includes fixed mirror 320.

An interference pattern L5 is produced from reflected beams L3 and L4 interfering at the beam splitter 310. The interference pattern L5 is detected by detector 330. The output of the detector 330 is input to the ASIC 160 via terminal 166. In one embodiment, the detector 330 includes a photodetector that is assembled through micromachining in the substrate (e.g., by etching the top surface of the substrate to realize an opening within which the photodetector may be placed) or that is realized monolithically within the substrate either through doping (e.g., to realize a P-I-N diode) or partial metallization (e.g., to realize metal-semiconductor-metal MSM photodetector).

As is also shown in FIG. 7, moveable mirror 120 is movable using a SOI electrostatic MEMS actuator 110. As in FIG. 6, the electrostatic MEMS actuator 110 is shown formed of a comb drive 115 and spring 118. A voltage can be applied to the comb drive 114 via terminal 114, thereby inducing a capacitance across terminals 112 and 114 and causing a displacement of the moveable mirror 120 to the desired position for reflection of the beam L1. As such, an optical path length difference (OPD) between beams L3 and L4 can be achieved that is substantially equal to twice the mirror displacement.

In addition, the capacitance across terminals 112 and 114 can be measured by the ASIC 160 via ports 162 and 164 to determine the position of the moveable mirror 120. Based on the determined moveable mirror position and the output of the detector 330, an interferogram 340 can be produced (e.g., by the DSP 170 shown in FIG. 3) to identify the light wavelength and the spectral print of any material in the light path.

The moveable mirror 120 in FIG. 7 is shown positioned at the zero path difference between the two optical paths (L1/L3 and L2/L4). However, in other embodiments, to remove phase noise and errors produced as a result of the capacitive sensing technique, the moveable mirror 120 can be positioned at a distance 6 behind the zero path position, and the moveable mirror 120 can be moved through the zero path position such that measurements are taken on both the positive and negative sides of the zero path position. In this embodiment, the source 300 is a wide band source (i.e., white light source) and the negative and positive sides may be equal or not equal. At the DSP 170 (shown in FIG. 3), the complex Fourier transform of the interferogram 340 can be taken to compensate for any phase errors in the mirror position. In another embodiment, instead of recording both the positive and negative sides of the interferogram, only a small part of the interferogram on the negative (left) side may be taken and used by the DSP to extract the correct signal and remove some of the phase noise and errors produced by the capacitive sensing technique.

In one embodiment, mirrors 120 and 320 are metallic mirrors, where selective metallization (e.g. using a shadow mask during metallization step) is used to protect the beam splitter. In another embodiment, non-metallic vertical Bragg mirrors are used to obtain a small foot print spectrometer. The Bragg mirrors can be realized using Deep Reactive Ion Itching (DRIE), thus producing successive vertical silicon/air interfaces. In addition, the Bragg mirrors can be designed either to have a wide spectrum reflection response to act as simple reflectors or with a wavelength selective response, depending on the application.

Although a silicon/air interface is described herein for the beam splitter 310, other mediums providing a half wave plane beam splitter can be used to realize the invention. For example, in another exemplary embodiment, micromachined or assembled glass half-planes or other materials, such as Pyrex, can be used instead of silicon to allow for a wider spectral window of operation. In addition, other materials, such as liquids or different gases, can be used instead of air to provide a degree of freedom to modify the reflection coefficient of the half plane beam splitting interface.

Figure 8:
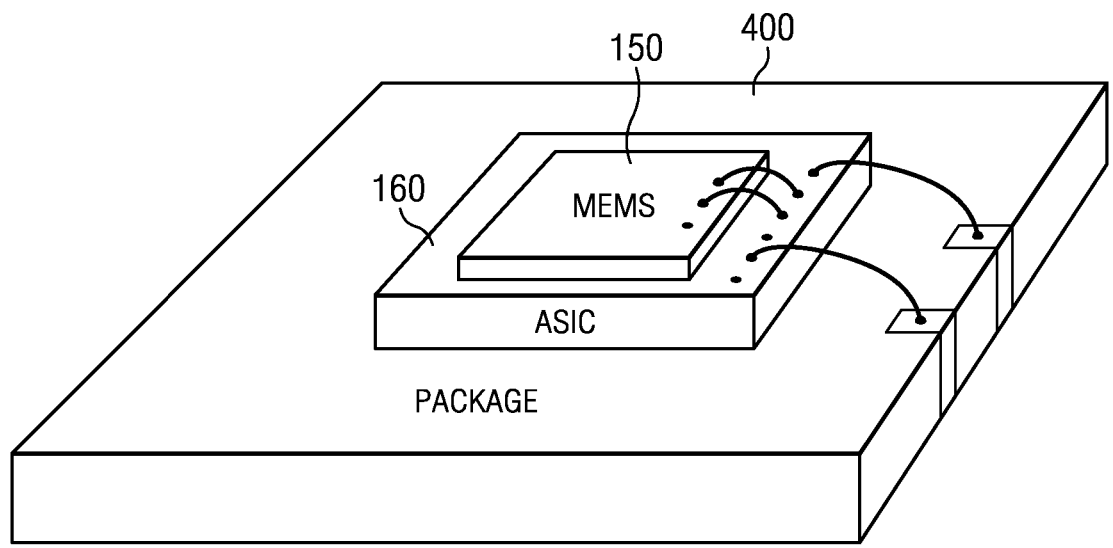
FIG. 8 is a diagram illustrating an exemplary MEMS die package, in accordance with the present invention.

FIG. 8 is a diagram illustrating an exemplary MEMS die package 400, in accordance with the present invention. By using capacitive sensing to determine the position of the moveable mirror, the MEMS interferometer 150 can be integrated with the ASIC 160 chip together on the same MEMS die package 400, thereby reducing the size, cost and complexity of the MEMS system.

Figure 9:
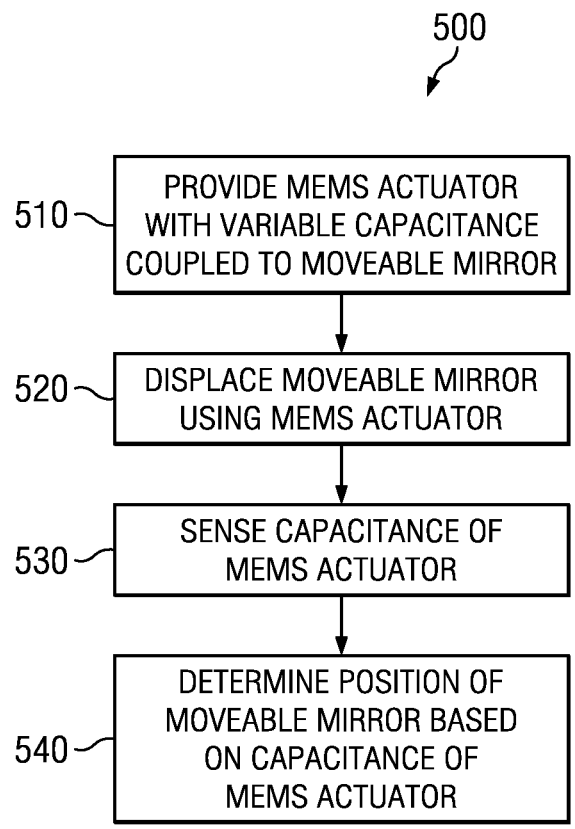
FIG. 9 illustrates an exemplary method for determining the position of a moveable mirror within a MEMS apparatus, in accordance with embodiments of the present invention.

FIG. 9 illustrates an exemplary method 500 for determining the position of a moveable mirror within a MEMS apparatus, in accordance with embodiments of the present invention. The method begins at 510, where an electrostatic MEMS actuator having a variable capacitance is provided coupled to the moveable mirror. At 520, the moveable mirror is displaced using the MEMS actuator. Thereafter, at 530, a current capacitance of the MEMS actuator is sensed, and at 540, the position of the moveable mirror is determined based on the current capacitance of the MEMS actuator.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A Micro Electro-Mechanical System (MEMS) apparatus, comprising:
   a moveable mirror;
   a MEMS actuator coupled to the moveable mirror to cause a displacement thereof, the MEMS actuator having a variable capacitance;
   a capacitive sensing circuit coupled to the MEMS actuator for sensing a current capacitance of the MEMS actuator; and
   a digital signal processor programmed to determine a position of the moveable mirror based on the current capacitance of the MEMS actuator, and further programmed to determine a relation between the position of the moveable mirror and an interferogram produced as a result of movement of the moveable mirror, and further programmed to process the interferogram based on the determined relation, and compensate for phase errors in the determined mirror position produced by the capacitive sensing circuit.

2. The MEMS apparatus of claim 1, wherein the MEMS actuator is an electrostatic actuator having two plates, the capacitive sensing circuit sensing the current capacitance between the two plates.

3. The MEMS apparatus of claim 2, wherein the MEMS actuator is an electrostatic comb drive actuator.

4. The MEMS apparatus of claim 1, wherein the capacitive sensing circuit includes a capacitance-to-voltage converter for receiving the current capacitance and producing an output voltage proportional to the capacitance.

5. The MEMS apparatus of claim 1, wherein the capacitive sensing circuit includes an application specific integrated circuit for sensing the current capacitance of the MEMS actuator.

6. The MEMS apparatus of claim 5, wherein the application specific integrated circuit further generates an actuation signal to cause motion of the MEMS actuator.

7. The MEMS apparatus of claim 5, wherein the MEMS actuator, the moveable mirror and the application specific integrated circuit are integrated together on a die package.

8. The MEMS apparatus of claim 1, wherein the digital signal processor is implemented within the application specific integrated circuit.

9. A Micro Electro-Mechanical System (MEMS) interferometer system, comprising:
    an interferometer including a moveable mirror optically coupled to receive and reflect light, the interferometer producing an optical interference pattern as a result of movement of the moveable mirror;
    a MEMS actuator coupled to the moveable mirror to cause a displacement thereof, the MEMS actuator having a variable capacitance;
    a capacitive sensing circuit coupled to the MEMS actuator for sensing a current capacitance of the MEMS actuator; and
    a digital signal processor programmed to determine a position of the moveable mirror based on the current capacitance of the MEMS actuator, and further programmed to determine a relation between the position of the moveable mirror and the optical interference pattern, and further programmed to process the optical interference pattern based on the determined relation and compensate for phase errors in the determined mirror position produced by the capacitive sensing circuit.

10. The MEMS interferometer system of claim 9, wherein the interferometer further includes:
    a beam splitter optically coupled to receive an incident beam and to split the incident beam into a first interfering beam and a second interfering beam;
    a fixed mirror optically coupled to receive the first interfering beam and to reflect the first interfering beam back towards the beam splitter to produce a first reflected interfering beam;
    the moveable mirror optically coupled to receive the second interfering beam and to reflect the second interfering beam back towards the beam splitter to produce a second reflected interfering beam; and
    a detector optically coupled to detect the optical interference pattern produced as a result of interference between the first reflected interfering beam and the second reflected interfering beam;
    wherein the displacement of the moveable mirror produces an optical path length difference between the first and second interfering beams equal to twice the displacement.

11. The MEMS interferometer system of claim 10, wherein the beam splitter is formed on a first surface of a first medium at an interface between the first medium and a second medium.

12. The MEMS interferometer system of claim 10, wherein the beam splitter consists of a single reflecting and refracting surface forming an interface between the first medium and the second medium;
    the first interfering beam is a refracted beam produced from a partial refraction of the incident beam from the single reflecting and refracting surface; and
    the second interfering beam is a reflected beam produced from a partial reflection of the incident beam from the single reflected and refracting surface.

13. The MEMS interferometer system of claim 9, wherein the interferometer is one of a Fourier Transform Infrared Spectroscopy (FTIR) spectrometer, a Michelson interferometer, a Mach Zender interferometer or a Fabry-Perot interferometer.

14. The MEMS interferometer system of claim 9, wherein the MEMS actuator is an electrostatic actuator having two plates, the capacitive sensing circuit sensing the current capacitance between the two plates.

15. The MEMS interferometer system of claim 9, wherein the capacitive sensing circuit includes an application specific integrated circuit for sensing the current capacitance of the MEMS actuator.

16. The MEMS interferometer system of claim 15, wherein the application specific integrated circuit further generates an actuation signal to cause motion of the MEMS actuator and conditions the optical interference pattern to produce a conditioned optical interference pattern that is input to the digital signal processor.

17. The MEMS interferometer system of claim 15, wherein the MEMS actuator, the interferometer and the application specific integrated circuit are integrated together on a die package.

18. The MEMS interferometer system of claim 15, wherein:
    the interferometer includes a wide band light source for producing a light beam, a first arm including the moveable mirror, a second arm including a fixed mirror and a beam splitter for splitting the light beam to traverse both the first arm and the second arm;
    the moveable mirror is moveable through both sides of a zero position corresponding to a zero optical path difference of the light beam between the first and second arms of the interferometer; and
    the interferometer records an interferogram on both sides of the zero position for use by the digital signal processor in phase correction.

19. A method for determining a position of a moveable mirror within a Micro Electro-Mechanical System (MEMS) apparatus, comprising:
    providing a MEMS actuator coupled to the moveable mirror, the MEMS actuator having a variable capacitance;
    displacing the moveable mirror using the MEMS actuator;
    sensing a current capacitance of the MEMS actuator;
    determining, using a digital signal processor, the position of the moveable mirror based on the current capacitance of the MEMS actuator;
    determining, using the digital signal processor, a relation between the position of the moveable mirror and an interferogram produced as a result of movement of the moveable mirror;
    processing the interferogram based on the relation using the digital signal processor;
    compensating for phase errors produced by the capacitive sensing circuit in the determined mirror position using the digital signal processor.

20. The method of claim 19, wherein the MEMS actuator is an electrostatic actuator having two plates, and wherein the sensing the current capacitance includes:

sensing the current capacitance between the two plates of the electrostatic actuator.

\* \* \* \* \*